(12) United States Patent
Braybrook

(10) Patent No.: US 11,361,502 B2
(45) Date of Patent: Jun. 14, 2022

(54) METHODS AND SYSTEMS FOR OBTAINING AERIAL IMAGERY FOR USE IN GEOSPATIAL SURVEYING

(71) Applicant: Ordnance Survey Limited, Southampton (GB)

(72) Inventor: Joseph Braybrook, Southampton (GB)

(73) Assignee: Ordnance Survey Limited, Southampton (GB)

( * ) Notice: Subject to any disclaimer, the term of this patent is extended or adjusted under 35 U.S.C. 154(b) by 280 days.

(21) Appl. No.: 16/701,290

(22) Filed: Dec. 3, 2019

(65) Prior Publication Data

US 2020/0184719 A1 Jun. 11, 2020

(30) Foreign Application Priority Data

Dec. 6, 2018 (EP) ..................................... 18210708

(51) Int. Cl.
*G06K 9/00* (2022.01)
*G06T 17/05* (2011.01)
*G06F 16/29* (2019.01)
*G01C 11/02* (2006.01)
(Continued)

(52) U.S. Cl.
CPC .............. *G06T 17/05* (2013.01); *G01C 11/02* (2013.01); *G06F 16/29* (2019.01); *G06T 3/4038* (2013.01); *G06V 20/13* (2022.01); *G06T 2207/10032* (2013.01)

(58) Field of Classification Search
CPC . G06T 17/00; G06T 7/55; G06T 2207/10032; G06T 2200/04; G06T 15/00; G06K 9/6202; G06K 9/3208; G06K 9/00805
See application file for complete search history.

(56) References Cited

U.S. PATENT DOCUMENTS 8,463,024 B1 * 6/2013 Gallup .................... G06T 7/596
382/154
8,928,964 B1 * 1/2015 Sternowski ............ G02B 30/50
359/238

(Continued)

OTHER PUBLICATIONS

Aug. 18, 2019—European Search Report—App No. 18210708.6.
(Continued)

*Primary Examiner* — Guillermo M Rivera-Martinez
(74) *Attorney, Agent, or Firm* — Banner & Witcoff, Ltd.

(57) ABSTRACT

Computer-implemented methods and systems are described herein for optimising aerial observation positions for capturing aerial images of a geographical area, in which both the field of view of the camera used to capture the images and the surface terrain is taken into consideration to ensure that all of the geographical area is fully and completely imaged. Aspects may be used for improving the aerial imagery used for geospatial surveying. The pixels of a digital surface model representative of a geographic area are analysed to determine whether they will be visible to a camera when it is located at a number of different observation points located above the same target geographic area. For each observation point at which an image is to be captured, each pixel is analysed to determine whether or not they are within the field of view of the camera when positioned at that given observation point.

20 Claims, 6 Drawing Sheets

(51) Int. Cl.
*G06T 3/40* (2006.01)
*G06V 20/13* (2022.01)

(56) References Cited

U.S. PATENT DOCUMENTS

| | | | | |
|---|---|---|---|---|
| 2007/0002040 | A1* | 1/2007 | Oldroyd | G01C 11/00 345/419 |
| 2007/0237420 | A1* | 10/2007 | Steedly | G06T 3/4038 382/284 |
| 2008/0016472 | A1* | 1/2008 | Rohlf | G06F 16/9537 715/848 |
| 2011/0012900 | A1* | 1/2011 | Rotem | G06T 7/32 345/419 |
| 2013/0021445 | A1* | 1/2013 | Cossette-Pacheco | G06T 15/40 348/46 |
| 2013/0155058 | A1* | 6/2013 | Golparvar-Fard | G06T 17/00 345/419 |
| 2013/0287290 | A1* | 10/2013 | Owechko | G06T 7/344 382/154 |
| 2013/0335566 | A1* | 12/2013 | Coulter | H04N 7/181 348/144 |
| 2014/0212028 | A1* | 7/2014 | Ciarcia | G06K 9/48 382/154 |
| 2017/0278268 | A1* | 9/2017 | Russell | G06T 7/579 |
| 2019/0026938 | A1* | 1/2019 | Fuscoe | G01C 11/30 |

OTHER PUBLICATIONS

Li, Jie et al., "An Effective Method for Complete Visual Coverage Path Planning," 3rd Int. Joint Conf. on Computational Science and Optimaization, May 28, 2010, pp. 497-500.

Ware et al., "Parallel Distributed Viewshed Analysis," Proc. of the 6th Int. Symp. on Advances in GIS, Nov. 6, 1998, pp. 151-156.

Kinder et al., "Parallel Processing for Terrain Analysis in GIS: Visibility as a Case Study," GeoInformatica, Aug. 1997, pp. 183-207.

Franklin, Randolph Wm, "Sitting Observers on Terrain," Mar. 18, 2002, pp. 1-11.

Cervilla, A.R. et al., "Siting Multiple Observers for Maximum Coverage: An Accurate Approach," Procedia Computer Science, vol. 51, 2015, pp. 356-365.

De Magalgaes, Salles V.G. et al., "Heuristics to Site Observers in a Terrain Represented by a Digital Elevation Matrix," INPE, Nov. 28 to Dec. 1, 2010, pp. 110-121.

"Interactive Viewshed Basics," ArcGIS Pro, ArcGIS Desktop, Oct. 21, 2018, pp. 1-5.

* cited by examiner

METHODS AND SYSTEMS FOR OBTAINING AERIAL IMAGERY FOR USE IN GEOSPATIAL SURVEYING

CROSS-REFERENCE TO RELATED APPLICATIONS

This application claims priority to European Patent Application No. 18210708.6, filed 6 Dec. 2018, of the same title, herein incorporated by reference in its entirety for all purposes.

FIELD

Aspects described herein relate to a computer implemented method and system for improving aerial imagery for use in geospatial surveying. In particular, aspects relate to a method of optimising the positions at which a set of aerial images are captured and systems using said method.

BACKGROUND

Most providers of digital maps rely on a very detailed topographical map database which stores the underlying data. For example, Ordnance Survey uses the very large scale topographic product OS MasterMap®, which records every feature larger than a few metres in one continuous dataset, and is constantly being updated. To obtain the underlying topographic data, various tools are used to survey the earth. One of the main tools used in geospatial surveying is the use of aerial imagery, from which topographic information may be derived to generate new or update existing topographic data.

To effectively image a geographical area, multiple images are taken from different observation points to ensure that the area is imaged from a number of different angles. The main reason for doing this is that, within each image, portions of the geographic area may be occluded within the image by various objects such as buildings, trees, road signs, rocks, bridges and the like. This is particularly problematic in built up areas such as towns and cities where there a number of objects at various heights. Therefore, by taking multiple overlapping images, an occlusion in one image should be remedied by at least one other image.

However, one problem with this is that it is not until the images have been captured that the occlusions are identified, by which point it is too late if there are any areas of land that cannot be seen from any of the camera observation points. Therefore, it is desirable to be able to plan the flight route of the aircraft before the images have been taken to determine where images need to be taken in order to effectively survey the whole geographic area without any portions missing.

As such, aspects described herein provide a method of determining which parts of a geographic area cannot be seen from an initial set of observation points and then adjusting one or more of the camera observation points based on this determination.

A number of prior art methods of determining whether two points are visible from another are known to exist. One simple method is based on the line of sight between the two points, however, this method merely considers whether there is an object intersecting a line extending from point to point.

Similarly, a viewshed is a multiple line of sight calculation applied to every pixel within a map to determine what locations can be seen from a point, whilst a cumulative viewshed is a calculation accounting for multiple points and indicating how many overlaps have occurred. However, this method calculates for the entire raster image and assumes an observer wants to look and is able to look in all directions from a point, without any limitation as to the extent to which that observer can see. However, in the case of aerial surveying, the cameras used to capture the images only have a limited field of view, and this needs to be taken into account.

Another known method is the use of projection based overlap maps, in which a quadrilateral is projected onto a map indicating the extent to which a camera can visibly see using its physical parameters. However, such methods are only concerned with the limits of the field of view, that is, how far the camera can see, and are not concerned with what cannot be seen within that field of view. As such, because projection based methods only provide information regarding the overall area covered by the camera and does not identify interior occlusions, the overlap calculations using this method are usually based on a basic terrain model (DTM), that is, the bare ground surface, and therefore do not reveal any internal geometric errors caused by buildings or trees.

SUMMARY

Embodiments and aspects described herein address the above noted problems by providing computer-implemented methods and systems for optimising aerial observation positions for use in capturing aerial images of a geographical area, in which both the field of view of the camera used to capture the images and the surface terrain is taken into consideration, that is, the earth's surface and any objects on it, to thereby ensure that all of the geographical area is fully and completely imaged. This is particularly useful for improving the aerial imagery used for geospatial surveying. To achieve this, the pixels of a digital surface model representative of a geographic area are analysed to determine whether they will be visible to an image capture device when it is located at a number of different observation points located above the same target geographic area. For each observation point at which an image is to be captured, each pixel of the digital surface model within the geographic area are analysed to determine whether they are (1) within the field of view of the image capture device when positioned at that given observation point, and/or (2) occluded by some other part of the digital surface model. This is done by projecting a ray from the pixel to the aerial observation point and tracking along the path of the ray to determine whether it is within the field of view and/or intersected by another pixel. If the ray is totally within the field of view and able to reach a certain height within the field of view without being intersected, then it can be considered visible by an image capture device at that observation point. From this analysis, it is possible to calculate the number of images from a given set of aerial observation points that a given pixel will be visible in, or conversely, will not be visible in. The number of images for which each pixel is visible can be used to identify areas that cannot be seen, or areas that might have geometric distortions due to a small number of images covering it. This information can then be used to debug, validate and enhance the imaging process. For example, it can be used to adjust the planned aerial observation points ahead of the flight to ensure that all areas are imaged sufficiently. As such, it enables the simulation of flight plans for obtaining aerial imagery to identify any occlusions before a flight has even been flown. For areas of tall buildings, or if using a low flying aircraft, this can be crucial for ensuring good coverage and minimizing the need to re-fly a certain area.

A first aspect provides a computer-implemented method of optimising aerial observation positions for capturing aerial images of a geographical area, the method comprising receiving a set of initial aerial observation positions corresponding to the geographical area, and receiving a three-dimensional digital surface model representative of a surface of the geographical area, wherein the digital surface model comprises a plurality of pixels. The method then determines whether the plurality of pixels are visible to an image capture device located at each of the set of initial aerial observation positions in dependence on a field view of the image capture device and a configuration of the digital surface model. For each pixel in the plurality of pixels, a number of initial aerial observation positions is calculated, wherein the pixel is visible to the image capture device when located at each of the number of initial aerial observation positions. The method then generates a set of optimised aerial observation positions in dependence on said calculation.

As such, the pixels of the digital surface model are analysed to determine how many of the set of initial aerial observation positions they are visible to when an image capture device such as a camera is located at those aerial observation positions. That is to say, if an image was captured at each of the initial aerial observation positions, how many images would contain each of the plurality of pixels. This is done by considering both the field of view of the image capture device, that is, how far the image capture device can see, and the configuration of the digital surface model, that is, whether other parts of the digital surface model, and thus the surface of the geographic area, are blocking each pixel from view. A new set of aerial observation positions is then derived based on this analysis, wherein the new set of aerial observation positions have been optimised in some way. For example, the new set of aerial observation positions may be optimised in order to improve the set of images that may be obtained therefrom, specifically, to ensure that the geographic area will be fully and evenly imaged, and/or optimised so as to maximise the efficiency of the flight required in order to capture the set of aerial images.

In this respect, the new aerial observation positions may be optimised so that at least a portion of any pixels that are not visible to many of the initial observation positions, if any, will be visible to a larger proportion of the new optimised aerial observation positions. For example, if a large portion of adjacent pixels is not visible to any or very few (say 1 or 2) of the initial aerial observation positions, the optimised aerial observation positions may be generated such that this portion of adjacent pixels is visible from more aerial observation positions. Similarly, if one or more pixels are known to represent an important feature of the geographic area, but is not visible to a sufficient number of the initial aerial observation positions, the optimised aerial observation positions may again be generated to ensure that the geographic area represented by these pixels is fully imaged.

The new aerial observation positions may also be optimised so as to reduce the total length of the flight, wherein only the positions that are essential for capturing the geographic area are flown through. For example, the new aerial observation positions may comprise aerial observation positions that can see above a threshold proportion of the pixels within the field of view of an imaging device at that position.

For each initial aerial observation position, the determining may comprise analysing the plurality of pixels to identify a set of pixels located within the field of view of the image capture device located at the respective initial aerial observation position. That is to say, for each initial aerial observation point, the plurality of pixels will each be processed to first determine whether they are within the field of view of an image capture device located at that initial aerial observation point. Those pixels that are not within the field of view can be disregarded and no further processing of these pixels is required. As such, only the group of pixels that are within the field of view will be left for further processing, thereby reducing the amount of processing required to analyse the area.

Identifying a set of pixels may comprise calculating a pixel angle from each pixel in the plurality of pixels to the respective initial aerial observation position, and comparing the pixel angle to a minimum angle calculated in dependence on the field of view of the image capture device located at the respective initial aerial observation position. As such, in order to identify the pixels that are within the field of view, the angle from each pixel to the initial aerial observation position relative to the ground is calculated. The field of view of the image capture device at the respective initial aerial observation position will form an angle with the ground that will correspond to the minimum angle that the calculated pixel angle can be and still be within the field of view. If the pixel angle is less than this minimum angle, it is not within the field of view and will be disregarded from any further processing in relation to that respective initial aerial observation point.

The determining may further comprise analysing the set of pixels to determine whether the set of pixels are visible to the image capture device located at the respective initial aerial observation position, wherein the analysing comprises generating a path from each pixel in the set of pixels to the respective initial aerial observation position, and determining whether the pixel is visible to the image capture device at the respective initial aerial observation position in dependence on a trajectory of said path. As such, once the set of pixels within the field of view have been identified, a virtual ray is projected from each of the pixels to the respective initial aerial observation position to determine whether the pixel is visible to an image capture device at this position.

In more detail, generating the path from each pixel in the set of pixels may comprise calculating a direction vector from the pixel to the respective initial aerial observation position, and iteratively moving along the direction vector towards the respective initial aerial observation position.

A pixel may then be determined to be visible to the image capture device at the respective initial aerial observation position if the path is not intersected by a further pixel and/or the path reaches a predetermined height above the digital surface model. That is to say, if the trajectory of the path is such that it reaches the initial aerial observation position without colliding with another part of the digital surface model, it is considered to be visible to an image capture device located thereto. Moreover, if the path reaches a certain height above the digital surface model, for example, a height that no part of the digital surface model itself reaches, the pixel can be marked as visible without needing to fully track the path all the way to the initial aerial observation position, thereby avoiding any unnecessary processing. For example, the predetermined height may be at least 300 meters, and in some case, no more than about 400 meters.

The method may further comprise generating an image map of the geographical area indicating the number of initial aerial observation positions calculated for each pixel in the plurality of pixels. That is to say, a visual representation of the number of initial aerial observation positions calculated for each pixel may be provided, for example, by colour coding each pixel according to the number of initial aerial observation positions that they are visible therefrom. In doing so, an overlap map indicating the number of images that each pixel would be visible in can be generated in order to quickly and effectively identify any geographic areas that would be insufficiently imaged by the set of initial aerial observation positions, or even occluded altogether.

Generating the set of optimised aerial observation positions may comprise identifying one or more pixels from the calculating, wherein the calculated number of initial aerial observation positions for the one or more pixels is less than a threshold value, and determining the set of optimised aerial observation positions in dependence on the identified one or more pixels. That is to say, pixels that are not visible to a certain number of initial aerial observation positions will be identified, and a new set of aerial observation positions will then be generated based on an analysis of these pixels.

For example, if the one or more pixels comprise localised patches or groups of pixels that are not visible to many of the set of initial aerial observation positions, if any, optimised aerial observation positions may be generated whereby those pixels will be visible to more aerial observation positions, and thus more images of the geographic area represented by those pixels may be obtained. As another example, if the one or more pixels represent an important geographic feature such as a building, landmark or road junction, the optimised aerial observation positions may be generated to ensure that object will be fully imaged.

In some examples, the threshold value may be two, or in other cases, the threshold value may be one. In cases where one or more pixels are only visible to one or two of the initial aerial observation positions, the geographic area represented by these pixels is only being imaged from a small number of directions. When the final image is produced for example, by patching together the images taken at each of the initial aerial observation points, distortions can occur in places that have not been imaged from a sufficient number of direction. This is particularly problematic where groups of adjacent pixels are all only visible to two or less aerial observation points.

In another example, the optimised aerial observation positions may be generated such that the one or more pixels are visible to the image capture device when located at a number of the optimised aerial observation positions above the threshold value. That is to say, the optimised aerial observation positions may be generated to ensure that these pixels are all now visible to a certain number of aerial observation positions.

In some case, the optimised aerial observation positions may be generated to ensure that all of the plurality of pixels are visible to at least one aerial observation position.

Generating the set of optimised aerial observation positions may comprise at least one of adjusting a coordinate of one or more of the initial aerial observation positions, and adding one or more further aerial observation positions to the set of initial aerial observation positions.

As such, the optimised aerial observation positions may be generated by moving one or more of the initial aerial observation positions. This may be done, for example, by adjusting the latitude, longitude and/or height of an initial aerial observation position. The optimised aerial observation positions may also be generated by adding additional aerial observation positions to the existing initial set.

The field of view may be calculated based on one or more physical parameters of the image capture device. For example, the one or more physical parameters may comprise one or more of: a focal length of the image capture device, a shape and/or size of an image sensor of the image capture device, a size of the image sensor of the image capture, a position on an aircraft on which the image capture device is installed, and an orientation of the image capture device relative to the geographical area.

A further aspect of the present invention provides a system comprising a processor, and a computer readable medium storing one or more instruction(s) arranged such that when executed the processor is caused to perform the method outlined above.

Another aspect of the present invention provides a method of aerial imaging, the method comprising capturing one or more images of a geographical area at a plurality of optimised aerial observation positions generated according to the method outlined above. That is to say, once the optimised aerial observation positions have been generated, the positions may be used to plan and execute a flight path of an aircraft being used to perform an aerial survey, with one more images being captured at the optimised aerial observation positions in order to image and survey the geographical area.

BRIEF DESCRIPTION OF THE DRAWINGS

Further features and advantages will become apparent from the following description of various aspects and embodiments, presented by way of example only, and by reference to the drawings, wherein.

DETAILED DESCRIPTION

Figure 1:
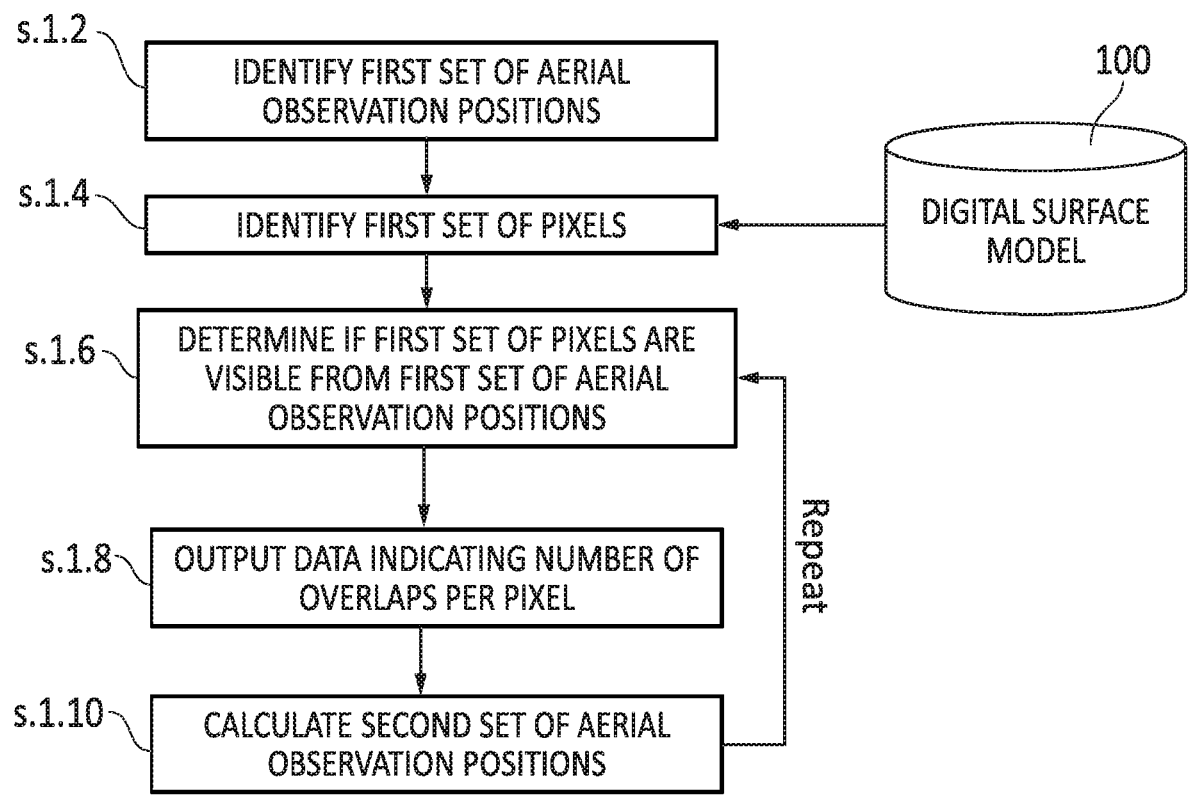
FIG. 1 is a flow diagram illustrating a method of optimising aerial observation positions according to one or more illustrative aspects described herein.

As discussed above, aerial imagery is a common tool used in geospatial surveying, whereby multiple overlapping images of a geographical area captured so as to build up a full and complete picture of that geographical area. FIG. 1 illustrates a method of optimising the locations from which aerial imagery is to be captured to ensure that all of the features of a geographic area are captured with minimal, if not zero, occlusions.

In the first step s.1.2, a first set of aerial observation positions is identified, the first set of aerial observation positions being distributed above a geographic area that is to be imaged. For example, the first set of aerial observation positions may correspond to a grid of points having dimensions of 1×1 kilometres located 400 m above a city or town that is 50 km², with each point having an associated geographic coordinate. This first set of aerial observation positions represent an initial set of points at which aerial images are to be taken. This may be based on a historic set of aerial observation positions used for previous flights, or they may be a new set of aerial observation positions identified primarily to provide a starting point for the following method of optimisation.

A surface model height map of the geographic area is then extracted from a Digital Surface Model database 100. The height map is a raster image of the geographic area, wherein the pixels of the image comprise information relating to the surface elevation and the geographic location that it represents. From the surface model height map, a first set of pixels to be analysed is identified (s.1.4). To do this quickly and effectively, the height map may be divided into tiles, each tile having a certain number of pixels, for example, 2000×2000 pixels per tile. The first set of pixels and the first set of aerial observation positions are then analysed to determine whether each of the first set of pixels would be visible to an image capture device located at each of the aerial observation positions (s.1.6). The method by which this is done will be described below in more detail with reference to FIG. 2.

Figure 5:
FIG. 5 is a diagram illustrating an output according to one or more illustrative aspects described herein.

From this analysis, the number of overlaps for each pixel is derived (s.1.8), that is to say, the number of aerial observation positions from which each pixel is visible such that the geographic location represented by the pixel will be visible in an image captured at the respective aerial observation position. This information can then be used to generate an overlap map image 500, shown by way of example in FIG. 5, whereby each pixel is coloured according to the number of aerial observation positions at which an image capture device would be able to see the pixel, that is, the number of overlapping images. From this image 500, it can be readily seen which pixels are not visible from any of the first set of aerial observation positions, and could therefore lead to gaps or errors in the geographic information derived from any images captured at the first set of aerial observation positions. Similarly, the overlap map image 500 is useful in identifying pixels that are only visible to one or two aerial observation positions. This is indicative of geographic locations that will only be clearly imaged from one or two angles, which can also lead to geometrically distorted images. As such, it is possible to determine which geographic locations represented by each pixel will require further imaging from different aerial observation positions.

Therefore, based on the number of overlaps, a second set of aerial observation positions can be calculated (s.1.10), where the second set of aerial observation positions have been optimised in some way. For example, the optimised aerial observation positions may be calculated based on pixels that have less than a threshold value of overlaps. This threshold value may depend on the type of geographic area being imaged. For example, in built up areas such as towns and cities where there is likely to be more objects at various heights, the threshold value may be at least 2 as it may be more important that point is imaged from a number of directions. In more rural areas, however, the threshold value may only be one or even zero, where one or two images of each point will be sufficient.

As another example, the second set of aerial observation positions may be optimised so as to improve the efficiency of the flight carried out in order to capture the aerial images. Flights for capturing aerial images are usually carried out by flying in a set pattern that passes through a number of planned points at which images are captured (i.e. the aerial observation positions). The second set of aerial observation positions may therefore be determined so as to reduce the total length of the flight needed, thereby reducing time and fuel costs. In this respect, the second set of aerial observation points may be such that only a number of critical points are in the flight plan to ensure the key features of the area are imaged. For example, the second set may be the aerial observation points that can see the most amount of pixels. This could be done, for example, by looking at the proportion of pixels within the field of view that would be visible to an image capture device at the respective aerial observation position. The second set of aerial observation positions may be those that are able to see a threshold proportion of pixels within its field of view, for example, those that could see above a threshold of around 80-90% of the pixels within the field of view. It will be appreciated that any suitable threshold may be set in this regard depending on the environment being imaged and the quality of image required.

Once pixels having an overlap count under the threshold value have been identified, the characteristics of these pixels can be analysed in order to calculate optimised aerial observation positions. For example, if there is a localised patch or group of pixels that all have an overlap count below the threshold value, the optimised aerial observation positions may be calculated to ensure that those pixels will be visible from more aerial observation positions. As another example, if the pixels represent an important geographic feature such as a building, landmark or road junction, the optimised aerial observation positions may be generated to ensure that particular object will be fully imaged. In another example, the optimised aerial observation positions may be calculated to ensure that a large proportion, if not all, of the pixels have an overlap count above the threshold value. For example, the optimised aerial observation positions may be calculated to ensure that at least 80% of the pixels have an overlap count above the threshold value.

The optimised aerial observation positions may include the first set of aerial observation positions, plus a number of further aerial observation positions that correspond to positions at which the previously occluded pixels can be seen. The optimised aerial observation positions may also be calculated by adjusting one or more of the first set of aerial observation positions, for example, by moving the original aerial observation position(s) by a certain latitude, longitude and height. Any new aerial observation positions may be validated by repeating the analysis performed at s.1.6 and s.1.8 until a second set of aerial observation positions are derived that will provide an optimised set of images with minimal or zero occlusions. This new set of aerial observation positions can then be used to plan the flight route of the aircraft in order to carry out the aerial imaging, wherein an aircraft carrying the image capture device flies to each of the optimised aerial observation positions so that the image capture device may take one or more images of the geographical area from that point.

As such, the above method ensures that the geographical area can be fully imaged from one flight without any holes or geometric distortions, and without the need to re-fly over any regions. This has the added benefits of saving time and money, as well as reducing the amount of carbon emissions caused by each flight.

The method by which the number of overlaps is determined will now be described with reference to FIGS. 2 to 4.

Once the first set of pixels and the first set of aerial observation positions have been identified, an analysis of each aerial observation position is performed to determine which pixels within the first set of pixels will be visible by an image capture device at the given aerial observation position. FIG. 2 shows the analysis performed for each aerial observation position.

In the first step s.2.2, the field of view of an image capture device $C_i$ at the $i^{th}$ aerial observation position is calculated, where i=1 . . . n, and n is the number of aerial observation positions in the first set of aerial observation positions. The image capture device may be any device suitable for capturing aerial images, for example, a photographic camera, a video camera or an infra-red camera. The angle of view (AOV), also referred to as the angular field of view, is calculated based on the specific properties of the image capture device that is to be used to capture the aerial images, for example, the focal length, the shape and/or size of the image sensor, the position and orientation of the device when installed on the aircraft, and other calibration data. For example, the angle of view may be calculated using the following equation:

$$AOV = 2 \arctan\left(\frac{d}{2f}\right) \quad (1)$$

where f is the focal length of the image capture device in in millimetres, and d is the size of the image sensor in millimetres.

Figure 3:
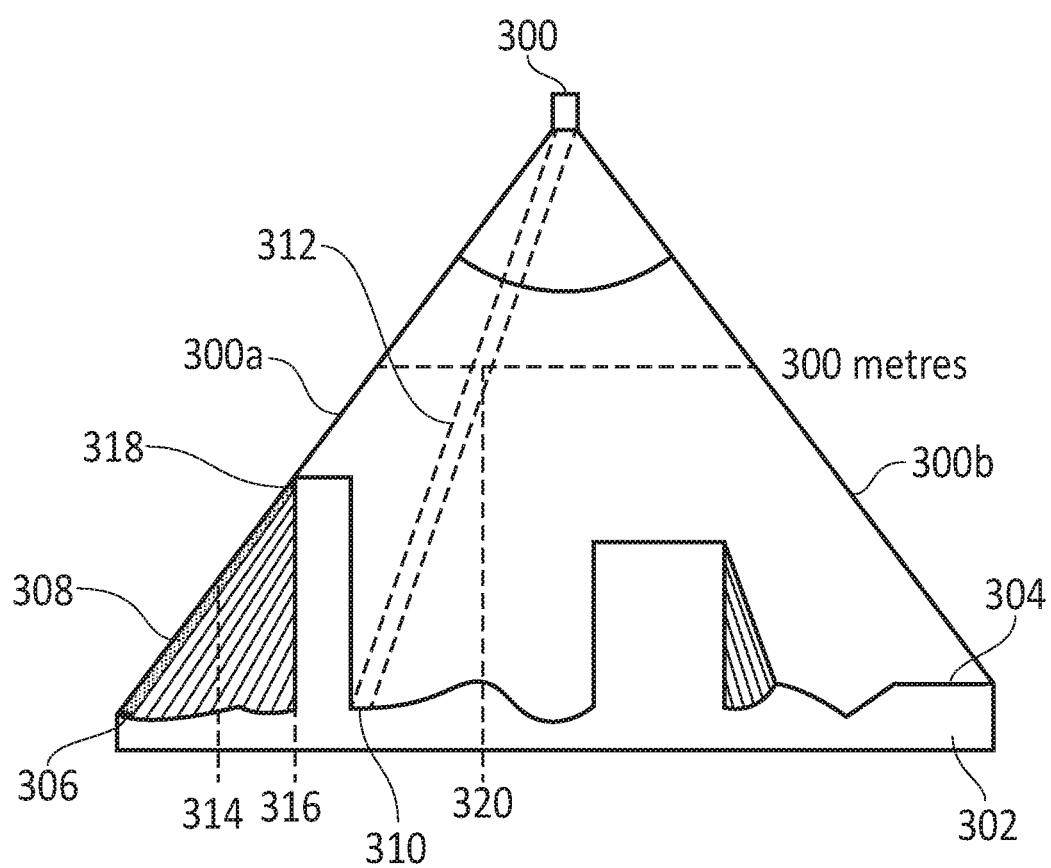
FIG. 3 is a diagram illustrating a method according to one or more illustrative aspects described herein.
Figure 4:
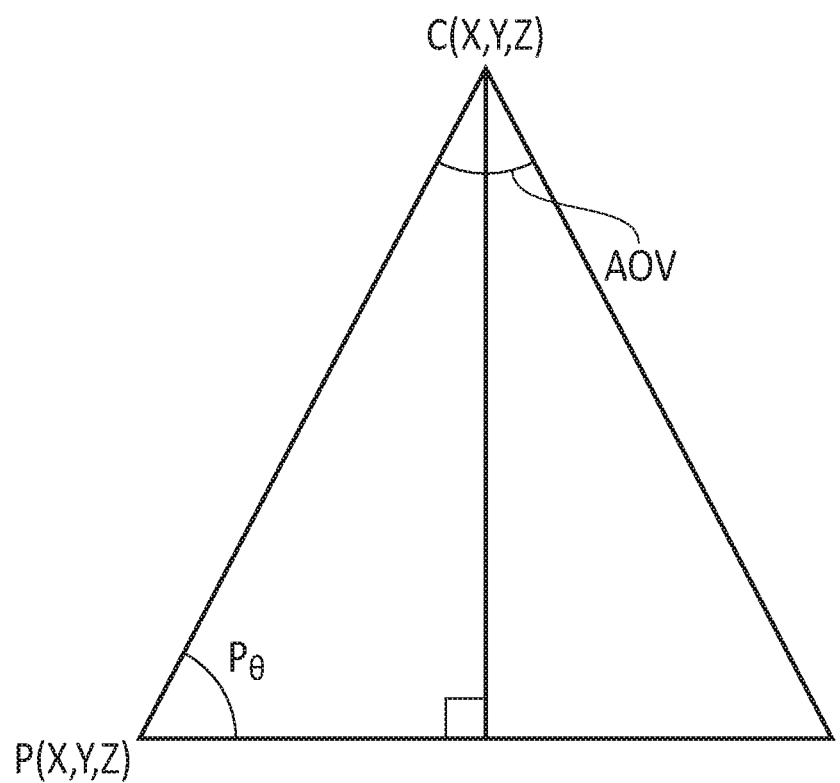
FIG. 4 is a further diagram illustrating a method according to one or more illustrative aspects described herein.

By way of example, FIG. 3 shows a camera 300 located above part of a height map 302 representative of a geographical area, for example, a 1 km² area in the City of London, wherein the field of view of the camera 300 is represented by lines 300$a$ and 300$b$. In the present example, the field of view 300 is shown as a two dimensional shape, however, it will be appreciated that in practice the field of view 300$a$-$b$ will be a three dimensional shape, for example, a cone or pyramid shape.

In the next step s.2.4, the geospatial position of a pixel $P_j$ is identified, where j=1 . . . m, and m is the number of pixels within the height map. This is done by converting the pixel's position within the height map into a geospatial point, P(x, y, z). As the image capture device $C_i$ also has an associated geospatial point, C(x, y, z), the two-dimensional distance between the pixel $P_j$ and the image capture device $C_i$ can be calculated (i.e. the ground distance), along with the angle between the pixel and the image capture device relative to the vertical axis, z. The pixel angle $P_\theta$ is first used to determine whether the pixel $P_j$ lies within the field of view of the image capture device $C_i$ (s.2.6). This is illustrated by FIG. 4. Here, the pixel angle $P_\theta$ is calculated (in degrees) in both [x,y] dimensions and compared against the field of view of the image capture device. An approximation can be made that for an aerial image capture device, the pixel $P_j$ is within the field of view if it satisfies the following equation:

$$P_\theta \geq \frac{(180 - AOV)}{2} \quad (2)$$

If it is found that the pixel angle $P_\theta$ is less than what is required to give an angle within the angle of view (AOV), the pixel $P_j$ is determined to be not visible (s.2.8) and the analysis for that pixel $P_j$ is complete. For example, if the angle of view is 80°, the minimum the pixel angle $P_\theta$ can be is 50°. In doing so, any pixels that are not within the field of view of the image capture device can be effectively ignored, thereby avoiding any unnecessary processing. This approximation assumes that the aerial image capture device is gyroscopically mounted, and therefore is always pointed vertically downwards towards the ground. However, it will be appreciated that the image capture device may be mounted such that it is pointed at a different angle, in which case another suitable calculation may be used for approximating the field of view and the minimum pixel angle.

If the pixel $P_j$ is within the field of view, a vector between the pixel $P_j$ to the image capture device $C_i$ can be calculated from the two-dimensional distance and pixel angle $P_\theta$, and normalised to provide a direction vector (s.2.10). The direction vector is then used to project a ray representing the path of light from the pixel $P_j$ to the image capture device $C_i$, for example, by iteratively moving along the direction vector towards the image capture device $C_i$. As one example, the ray may be formed by iteratively moving along the scalar components of the direction vector, for example, by moving along the scalar components such that the ray is moved towards the image capture device $C_i$ in 2 metre increments.

For each increment forwards along the ray, step 2.12 is performed so as to compare the ray with the digital surface model height map to determine whether it is still visible at each position.

At each increment, the ray will be analysed to compare the height of the ray as it moves towards the image capture device $C_i$ to the height of the digital surface model height map, and to determine whether its current location corresponds to another pixel of the digital surface model height map. At each increment, the ray is compared to the portion of the height map having the same ground position, that is, the same two dimensional position in the [x,y] plane. If it is found that the ray does intersect with the digital surface model height map, that is to say, the ray is in the same position as another pixel of the digital surface model height map and has therefore collided with that pixel, then the pixel $P_j$ is not visible to the image capture device $C_i$ (s.2.14). If the ray does not intersect with any part of the digital surface model height map, and the ray is at a height that is higher than the digital surface model height map at the given ground position, it will be considered visible to the image capture device $C_i$ (s.2.16) and the overlap count for the pixel $P_j$ will be increased by 1 (s.2.18), the overlap count being the number of image capture devices to which that pixel is visible. In general, if the ray is able to reach a height above a predetermined threshold without intersecting with another part of the height map, for example, a height of about 300 m, the pixel $P_j$ will be considered visible.

FIG. 3 provides an example of two pixels 306 and 310 of the height map 302 to be analysed with respect to the camera 300, wherein both pixels 306 and 310 are within the field of view 300$a$-$b$. Considering the first pixel 306, a direction vector between the pixel 306 and the camera 300 is calculated and used to project a ray 308 from the pixel 306 to the camera 300 by moving along the direction vector in 2 metre increments, the ray 308 being analysed as discussed above with reference to step 2.12 of FIG. 2. For example, at ground position 314, it will be determined that the height of the ray 308 is higher than the height map 302 at that location, and therefore does not collide with the height map 302. However, as the ray 308 reaches ground position 316, it can be seen that the height of ray 308 is below the peak height of the height map 302 and that another pixel 318 of the height map 302 is at the same position as the ray 308, that is, the ray 308 collides with the height map 302. Therefore, the first pixel 306 will not visible to the camera 300.

Figure 2:
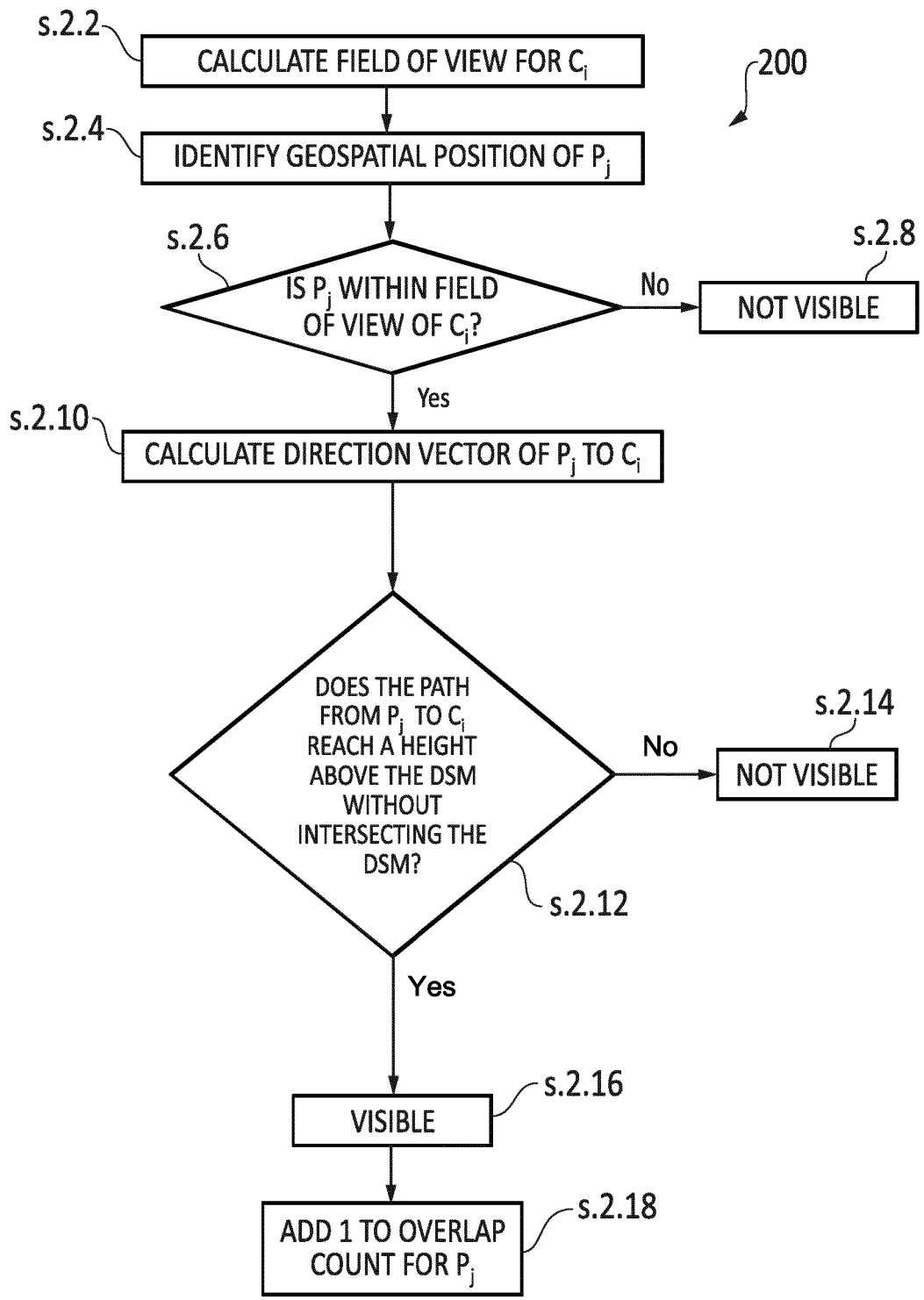
FIG. 2 is a flow diagram further illustrating a part of the method of FIG. 1.

Considering now the second pixel 310, a direction vector between the pixel 310 and the camera 300 will again be calculated and used to project a ray 312 from the pixel 310 to the camera 300 as described previously, the ray 312 being analysed as discussed above with reference to step 2.12 of FIG. 2. Moving incrementally along the ray 312, it can be seen that the ray 312 is higher than the height map 302 and does not intersect any part of the height map 302. When the ray 312 reaches ground position 320, it is determined that the ray 312 has reached a threshold height, in this example, a height of 300 m, and the pixel 310 can be marked as visible to the camera 300 and no further processing is required.

As such, the height and position of the ray will be continuously analysed as it moves towards the image capture device $C_i$ until it is determined whether the ray is able to reach a certain height above the digital surface model height map without intersecting a part of the height map. If it can, then the pixel $P_j$ will be considered visible and the overlap count for that pixel will be increased by 1.

By casting the ray back from the ground, only a limited number of calculations need to be performed per pixel to ascertain whether a collision has occurred, thereby avoiding time consuming and unnecessary processing.

The above method 200 is repeated for each image capture device $C_i$ within the geographical area to be imaged, with steps 2.4 to 2.18 being repeated for every pixel $P_j$ within the digital surface model height map of that same geographical area. Each iteration of the method for both pixels and image capture devices can be performed simultaneously to provide increased processing speeds.

Once the method 200 of FIG. 2 has been performed for all of the image capture devices $C_i$ and pixels $P_j$ to be analysed, the resulting overlap count for the pixels $P_j$ will be used to generate an overlap map image, as discussed previously with reference to FIG. 5, which may be then used to optimise the aerial observation positions, as discussed with reference to FIG. 1.

The above therefore provides a fast and optimised method for calculating the optimal locations from which aerial images of a geographic area may be captured. In particular, the method is optimised for image capture devices so that only the region within the device's field of view needs to be processed, and hence reduces the amount of processing required. In this respect, for a given geographical area, the method only considers the pixels and aerial observation positions within that area, automatically disregarding pixels if they are not within the field of view of an image capture device located at each observation point, thereby reducing the total number of iterations required to analyse the area. This is in contrast to previous method which consider whether an object can be observed from any other point in all directions. As such, if part of an object is not within the field of view of an image capture device, it will not be included in the processing, even if another part of the same object is visible. For example, a building may be tall enough that part of it falls outside the field of view of an image capture device, even when its base is visible to the same device. However, by considering the extent of the field of view, needless processing of the pixels corresponding to the part of the building not visible to the image capture device can be avoided. Furthermore, the resulting output also takes into account the surface of the terrain and its effect on what can be seen by an image capture device. If an object such as a tree or building is in the way of a pixel, the pixel will automatically register as occluded.

Additionally, the method steps shown in FIG. 2 can be simultaneously performed for both pixels and aerial observation positions, thereby reducing the time taken to process the whole of the geographic area. That is to say, the method of FIG. 2 can be run in parallel for each aerial observation position, and for each aerial observation position, the method can be run in parallel for each pixel under inspection.

Figure 6:
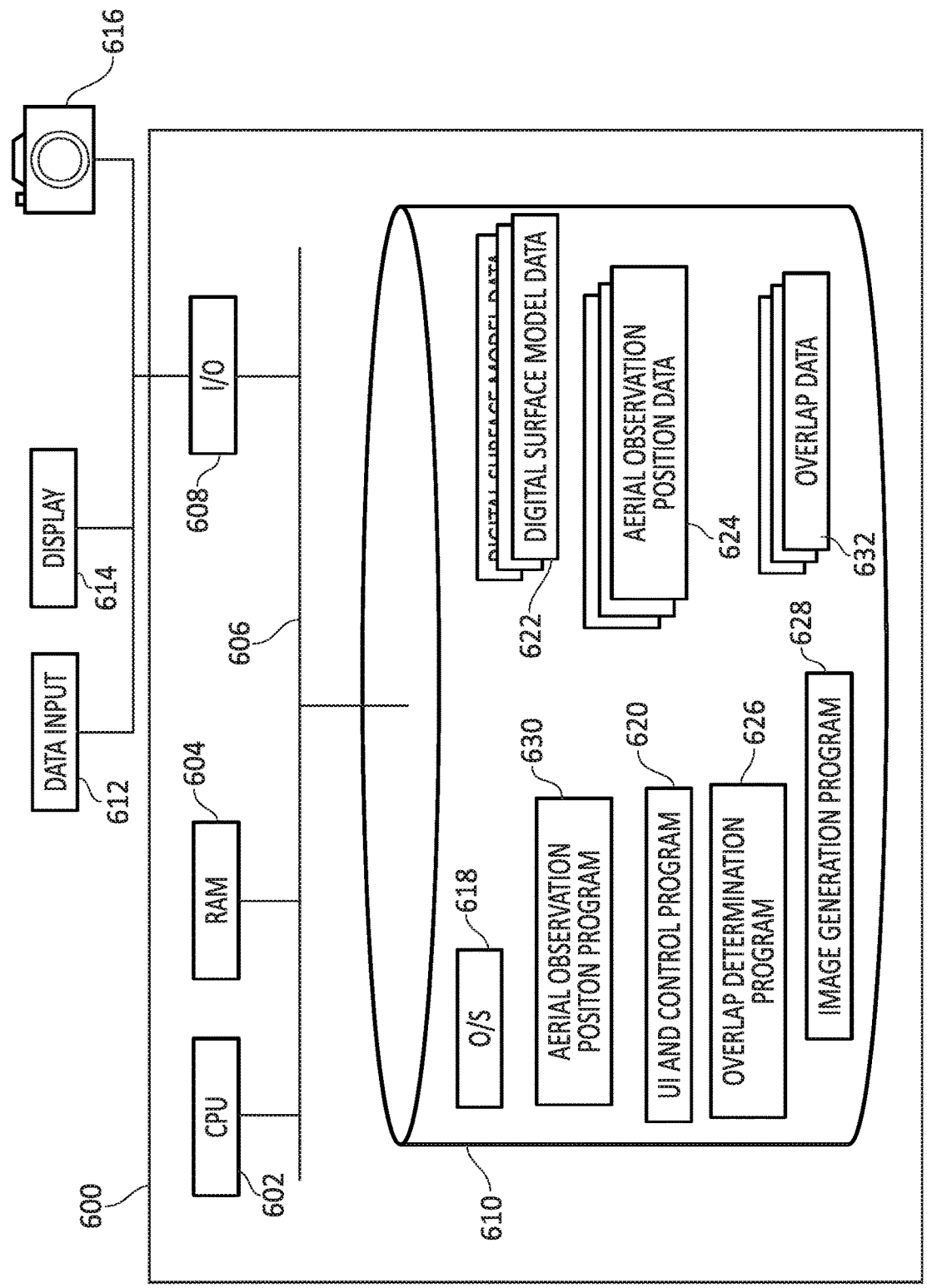
FIG. 6 is a block diagram illustrating a computer system on which one or more illustrative aspects described herein may be implemented.

FIG. 6 illustrates an example of a general computing device 600 that may form the platform for one or more embodiments and/or aspects described herein. For example, the computing device 600 may be a mobile phone, a tablet, a wearable computing device, IVI system or the like. The computing device 600 comprises a central processing unit (CPU) 602 and a working memory 604, connected by a common bus 606, and having an input-output (I/O) interface 608 arranged to receive control inputs from a user via a device connected to a data input port 612 such as a keyboard, mouse, touchscreen, push button, or other controller, and provide output information via a user interface which is displayed on a visual display device 614. The I/O interface 608 is also arranged to receive further inputs via various other devices and sensors, including but not limited to an image capture device 616.

The computing device 600 is also provided with a computer readable storage medium 610 such as a hard disk drive (HDD), flash drive, solid state drive, or any other form of general-purpose data storage, upon which stored data, such as digital surface model data 622, aerial observation position data 624 and overlap data 632, and various programs are arranged to control the computing device 600 to operate in accordance with embodiments and aspects described herein. For example, stored on the computer readable storage medium 610 is an operating system program 618 that when run by the CPU 602 allows the system to operate. Also provided is an overlap determination program 626, an image generation program 628 and an aerial observation position program 630 which together implement the method of improving aerial imagery as described herein when run by the CPU 602, as will be described in more detail below. In order to interface with and control the overlap determination program 626, image generation program 628 and aerial observation position program 630, a user interface and control program 620 is also provided, that controls the computing device 600 to provide a visual output to the display 614, and to receive user inputs via any input means connected to the data input port 612, or any other device connected to the I/O interface 608 in order to control the overlap determination program 626, image generation program 628 and aerial observation position program 630.

Input data upon which the overlap determination program 626 operates includes data input to the computer system 600 received via the data input port 612 and the image capture device 616. Such data may include the instructions identifying a particular geographical area to be imaged, as well as data relating to the properties of an image capture device needed to calculate the field of view, as discussed previously. Additionally, digital surface model data 622 and aerial observation position data 624 may be received and stored on the computer readable storage medium 610. As discussed previously, the digital surface model data 622 provides the underlying data required to render a surface model height map for a given geographical area. The aerial observation position data 624 comprises data relating to aerial observation positions at which images are to be captured. This may include a new set of geospatial coordinates input by a user, or it could be historic data relating to the aerial observation positions used for previous imaging of the geographical area.

Once instructions regarding a geographical area to be imaged have been received, the overlap determination program 626 will extract the relevant data from the digital surface model data 622 and aerial observation position data 624 for the given geographical area, and use this data to calculate the number of overlaps for each pixel within the relevant digital surface model data 622, as described above with reference to FIGS. 1 and 2. The resulting overlap data 632 will then be input to the image generation program 626 to generate an overlap map image, such as that shown in FIG. 5, which can then be output to the user via the visual display device 614 for analysis. As described previously, the overlap data 632 can be used to identify gaps or geometric errors in any images that will be obtained from a particular set of aerial observation positions. The overlap data 632 can then be input to the aerial observation position program 630, which uses the overlap data 632 to calculate a new set of aerial observation positions for output to the user, as discussed above with reference to step 1.10 of FIG. 1, wherein the new set of aerial observation positions have been optimised to ensure that the geographical area is imaged fully with minimal or no occlusions. The new set of aerial observation positions can then be added to or used to update the existing aerial observation position data 624 stored in the computer readable storage medium 610. Furthermore, as discussed above, the new set of aerial observation positions may be input to the overlap determination program 626, along with the relevant digital surface model data 622, to recalculate the number of overlaps, and thereby validate the new set of aerial observation positions before they are used to obtain a set of aerial images.

Various modifications, whether by way of addition, deletion and/or substitution, may be made to all of the above described embodiments to provide further embodiments, any and/or all of which are intended to be encompassed by the appended claims.

The invention claimed is:

1. A computer-implemented method of optimising aerial observation positions for capturing aerial images of a geographical area, the method comprising:
   receiving a set of initial aerial observation positions corresponding to the geographical area;
   receiving a three-dimensional digital surface model representative of a surface of the geographical area, wherein the digital surface model comprises a plurality of pixels;
   determining whether the plurality of pixels are visible to an image capture device located at each of the set of initial aerial observation positions in dependence on a field of view of the image capture device and a configuration of the digital surface model, wherein for each initial aerial observation position the plurality of pixels are analysed to identify a subset of pixels located within the field of view of the image capture device located at the respective initial aerial observation position, wherein identifying the subset of pixels comprises:
      (i) calculating a pixel angle from each pixel in the plurality of pixels to the respective initial aerial observation position; and
      (ii) comparing the pixel angle to a minimum angle calculated in dependence on the field of view of the image capture device located at the respective initial aerial observation position, wherein when the pixel angle is more than or equal to the minimum angle, the pixel is identified as part of the subset of pixels;
   calculating, for each pixel in the plurality of pixels, a number of the initial aerial observation positions, wherein the pixel is visible to the image capture device when the image capture device is located at each of the number of the initial aerial observation positions; and
   generating a set of optimised aerial observation positions in dependence on said calculation of the number of the initial aerial observation positions.

2. A method according to claim 1, wherein method further comprises analysing the set of pixels to determine whether the subset of pixels are visible to the image capture device located at the respective initial aerial observation position, wherein the analysing comprises:
   generating a path from each pixel in the subset of pixels to the respective initial aerial observation position; and
   determining whether the pixel is visible to the image capture device at the respective initial aerial observation position in dependence on a trajectory of said path.

3. A method according to claim 2, wherein generating the path from each pixel in the subset of pixels comprises:
   calculating a direction vector from the pixel to the respective initial aerial observation position; and
   iteratively moving along the direction vector towards the respective initial aerial observation position.

4. A method according to claim 2, wherein a pixel is determined to be visible to the image capture device at the respective initial aerial observation position if the path does not intersect a further pixel of the digital surface model and/or the path reaches a predetermined height above the digital surface model.

5. A method according to claim 4, wherein the predetermined height is at least 300 meters.

6. A method according to claim 1, further comprising generating an image map of the geographical area indicating the number of initial aerial observation positions calculated for each pixel in the plurality of pixels.

7. A method according to claim 1, wherein generating the set of optimised aerial observation positions comprises:
   identifying one or more pixels from the calculating, wherein the calculated number of initial aerial observation positions for the one or more pixels is less than a threshold value; and
   determining the set of optimised aerial observation positions in dependence on the identified one or more pixels.

8. A method according to claim 7, wherein the threshold value is two.

9. A method according to claim 7, wherein the set of optimised aerial observation positions are such that the one or more pixels are visible to the image capture device when located at a number of the optimised aerial observation positions above the threshold value.

10. A method according to claim 1, wherein generating the set of optimised aerial observation positions comprises at least one of:
    adjusting a coordinate of one or more of the initial aerial observation positions; and
    adding one or more further aerial observation positions to the set of initial aerial observation positions.

11. A method according to claim 1, wherein the field of view is calculated based on one or more physical parameters of the image capture device.

12. A method of aerial imaging, the method comprising capturing one or more images of a geographical area at a plurality of optimised aerial observation positions generated according to a method comprising:
    receiving a set of initial aerial observation positions corresponding to the geographical area;
    receiving a three-dimensional digital surface model representative of a surface of the geographical area, wherein the digital surface model comprises a plurality of pixels;

determining whether the plurality of pixels are visible to an image capture device located at each of the set of initial aerial observation positions in dependence on a field of view of the image capture device and a configuration of the digital surface model, wherein for each initial aerial observation position the plurality of pixels are analysed to identify a subset of pixels located within the field of view of the image capture device located at the respective initial aerial observation position, wherein identifying the subset of pixels comprises:
  (i) calculating a pixel angle from each pixel in the plurality of pixels to the respective initial aerial observation position; and
  (ii) comparing the pixel angle to a minimum angle calculated in dependence on the field of view of the image capture device located at the respective initial aerial observation position, wherein when the pixel angle is more than or equal to the minimum angle, the pixel is identified as part of the subset of pixels;
calculating, for each pixel in the plurality of pixels, a number of the initial aerial observation positions, wherein the pixel is visible to the image capture device when the image capture device is located at each of the number of the initial aerial observation positions; and
generating a set of optimised aerial observation positions in dependence on said calculation of the number of the initial aerial observation positions.

13. A system comprising:
a processor; and
non-transitory memory storing one or more instruction(s) arranged such that when executed the processor is caused to perform a method of optimising aerial observation positions for capturing aerial images of a geographical area, wherein the processor is caused to:
  receive a set of initial aerial observation positions corresponding to the geographical area;
  receive a three-dimensional digital surface model representative of a surface of the geographical area, wherein the digital surface model comprises a plurality of pixels;
  determine whether the plurality of pixels are visible to an image capture device located at each of the set of initial aerial observation positions in dependence on a field of view of the image capture device and a configuration of the digital surface model, wherein for each initial aerial observation position the plurality of pixels are analysed to identify a subset of pixels located within the field of view of the image capture device located at the respective initial aerial observation position, wherein identifying the subset of pixels comprises:
    (i) calculating a pixel angle from each pixel in the plurality of pixels to the respective initial aerial observation position; and
    (ii) comparing the pixel angle to a minimum angle calculated in dependence on the field of view of the image capture device located at the respective initial aerial observation position, wherein when the pixel angle is more than or equal to the minimum angle, the pixel is identified as part of the subset of pixels;
  calculate, for each pixel in the plurality of pixels, a number of the initial aerial observation positions, wherein the pixel is visible to the image capture device when the image capture device is located at each of the number of the initial aerial observation positions; and
  generate a set of optimised aerial observation positions in dependence on said calculation of the number of the initial aerial observation positions.

14. A system according to claim 13, wherein the processor is further caused to analyse the set of pixels to determine whether the subset of pixels are visible to the image capture device located at the respective initial aerial observation position, wherein the analysing comprises:
  generating a path from each pixel in the subset of pixels to the respective initial aerial observation position; and
  determining whether the pixel is visible to the image capture device at the respective initial aerial observation position in dependence on a trajectory of said path.

15. A system according to claim 14, wherein the processor is configured to generate the path from each pixel in the subset of pixels by:
  calculating a direction vector from the pixel to the respective initial aerial observation position; and
  iteratively moving along the direction vector towards the respective initial aerial observation position.

16. A system according to claim 14, wherein a pixel is determined to be visible to the image capture device at the respective initial aerial observation position if the path does not intersect a further pixel of the digital surface model and/or the path reaches a predetermined height above the digital surface model.

17. A system according to claim 13, wherein the processor is caused to generate the set of optimised aerial observation positions by:
  identifying one or more pixels from the calculating, wherein the calculated number of initial aerial observation positions for the one or more pixels is less than a threshold value; and
  determining the set of optimised aerial observation positions in dependence on the identified one or more pixels.

18. A system according to claim 17, wherein the set of optimised aerial observation positions are such that the one or more pixels are visible to the image capture device when located at a number of the optimised aerial observation positions above the threshold value.

19. A system according to claim 13, wherein the processor is caused to generate the set of optimised aerial observation positions by at least one of:
  adjusting a coordinate of one or more of the initial aerial observation positions; and
  adding one or more further aerial observation positions to the set of initial aerial observation positions.

20. A system according to claim 13, wherein the field of view is calculated based on one or more physical parameters of the image capture device.

* * * * *